United States Patent [19]

Kuno et al.

[11] 4,061,023

[45] Dec. 6, 1977

[54] FUEL-METER-COMBINED FUEL CONSUMPTION RATE METER

[75] Inventors: Akira Kuno, Nagoya; Yoshio Shinoda, Okazaki, both of Japan

[73] Assignee: Nippon Soken, Inc., Nishio, Japan

[21] Appl. No.: 635,269

[22] Filed: Nov. 25, 1975

[30] Foreign Application Priority Data

Jan. 27, 1975  Japan .............................. 50-12180[U]

[51] Int. Cl.² .............................................. G01F 9/02
[52] U.S. Cl. ..................................................... 73/114
[58] Field of Search ............. 73/114, 113; 235/92 MT, 235/150.21

[56] References Cited

U.S. PATENT DOCUMENTS

| | | | |
|---|---|---|---|
| 2,593,628 | 4/1952 | Strong | 73/114 UX |
| 2,941,397 | 6/1960 | Lee | 73/114 |
| 3,549,868 | 12/1970 | Watson et al. | 73/114 X |
| 3,908,451 | 9/1975 | Walker et al. | 73/114 |

Primary Examiner—Jerry W. Myracle
Attorney, Agent, or Firm—Cushman, Darby & Cushman

[57] ABSTRACT

A fuel consumption rate meter incorporating a fuel meter. The momentary amount of fuel consumed by a running vehicle is measured and the momentary fuel consumption rate is computed from the momentary amount of fuel consumed. The momentary amount of fuel consumed is integrated to give the total amount of the fuel consumed. The computed fuel consumption rate and the integrated fuel amount are indicated on the same panel.

2 Claims, 12 Drawing Figures

FUEL-METER-COMBINED FUEL CONSUMPTION RATE METER

BACKGROUND OF THE INVENTION

1. Field of the Invention

The present invention relates to a fuel-meter-combined fuel consumption rate meter and more particularly a fuel consumption rate meter for automobiles which additionally incorporates a fuel meter for indicating the amount of fuel consumed or the quantity of fuel remaining.

2. Description of the Prior Art

The conventional fuel consumption rate meters for automobiles are disadvantageous in that these meters independently indicate only the momentary fuel consumption rate in kilometers per liter or miles per gallon, for example, and therefore they must be provided with a separate fuel meter for indicating the amount of fuel consumed or the amount of fuel remaining.

SUMMARY OF THE INVENTION

It is an object of the present invention to provide a fuel-meter-combined fuel consumption rate meter which is capable of indicating within a limited area a greater amount of information on the driving conditions of the automobile. In accordance with the present invention, there is thus provided a fuel-meter-combined fuel consumption rate meter wherein the momentary amount of fuel consumed is measured by fuel consumption rate measuring means and then integrated to give the total fuel amount and the indication of this total fuel amount is built into a display panel for displaying the fuel consumption rate. According to the invention, there is a great advantage that the indication of both fuel consumption rate and fuel amount may be accomplished through a single meter to provide the driver with information on the driving conditions of the vehicle.

BRIEF DESCRIPTION OF THE DRAWING

In the accompanying drawings showing an embodiment of a fuel-meter-combined fuel consumption rate meter according to this invention.

DESCRIPTION OF THE PREFERRED EMBODIMENT

Figure 1:
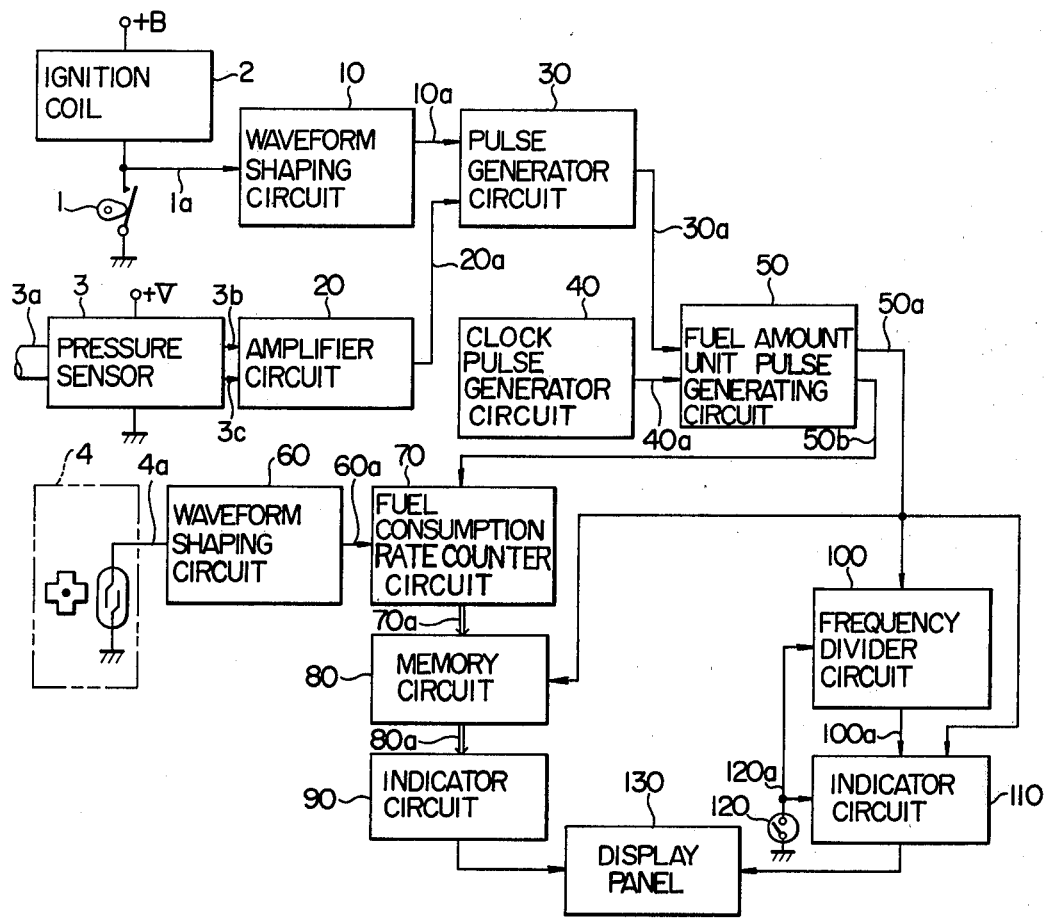
FIG. 1 is a block diagram showing the general construction of the fuel consumption rate meter according to the invention.

The present invention will now be described in greater detail with reference to the illustrated embodiment. Referring first to the block diagram of FIG. 1 schematically showing the general construction of the device of this invention, numeral 1 designates the point switch of a distributor mounted in an automobile which, in the case of a four-cylinder engine, opens and closes twice for every one revolution of the engine to deliver breaking signals on a terminal 1a. Numeral 2 designates an ignition coil which is operated by the opening and closing of the distributor point switch 1, 10 a waveform shaping circuit for reshaping the breaking signal generated at the terminal 1a in synchronism with the revolutions of the engine to generate a revolution pulse. Numeral 3 designates a semiconductor pressure sensor connected to the engine suction pipe through a rubber tube 3a to measure the pressure in the suction pipe, 20 an amplifier circuit for amplifying the detection signal of the semiconductor pressure sensor 3 at its output terminals 3b and 3c to generate a pressure signal at a terminal 20a, 30 a pulse generator circuit which receives as its inputs the revolution pulse at the terminal 10a and the pressure signal at the terminal 20a and generates at a terminal 30a in synchronism with the revolution signal a consumption pulse having a time width proportional to the pressure signal. Numeral 40 designates a clock pulse generator circuit. The intake fuel amount $q$ is given by the following equation $$q = K \cdot R \cdot P \qquad (1)$$

where $R$ is the number of revolutions of the engine, $P$ is the absolute intake pressure and $K$ is a constant which is determined by the engine (combustion chamber volume), the mixing ratio of fuel and air and the volumetric efficiency. The clock pulse generator circuit 40 generates at a terminal 40a clock pulses having a constant frequency determined by the constant K. Numeral 50 designates a fuel amount unit pulse generating circuit which receives the consumption pulse from the pulse generator circuit 30 and the clock pulses from the clock pulse generator circuit 40 to compute the intake fuel amount $q$ of the above-mentioned equation. For example, when the intake fuel amount $q$ reaches 0.4 cc the fuel amount unit pulse generating circuit 50 generates a "1" level instruction pulse at a terminal 50a and a "1" level synchronizing pulse is generated at a terminal 50b when the intake fuel amount $q$ reaches 0.4032 cc. Numeral 4 designates a vehicle speed sensor for detecting the wheel revolutions of the vehicle, which comprises a magnet fixedly mounted on a speedometer cable and a reed switch disposed adjacent to the peripheral edges of the magnet whereby a speed signal consisting of 4 pulses is generated at a terminal 4a for every revolution of the cable. Numeral 60 designates a waveform shaping circuit for reshaping the waveform of the speed signal at the terminal 4a and generating speed pulses at a terminal 60a, 70 a fuel consumption rate counter circuit for counting the speed pulses generated at the terminal 60a after receipt of the synchronizing pulse at the terminal 50b, 80 a memory circuit for storing the count of the fuel consumption rate counter circuit 70 generated at a terminal 70a, 90 an indicator circuit for indicating the stored value of the memory circuit 80 generated at a terminal 80a. Numeral 100 designates a frequency divider circuit for subjecting the instruction pulse generated at the terminal 50a to a 1/25 frequency division and generating a unit pulse at a terminal 100a each time the amount of fuel consumed reaches 10 cc, 110 an indicator circuit which integrates the unit pulse at the terminal 100a to indicate the fuel amount and which also partly flashes on and off at a frequency proportional to the frequency of occurrence of the instruction pulse by going on in response to the generation of each instruction pulse at the terminal 50a. Numeral 120 designates a reset switch which is operated in response to the refueling of the fuel to reset the frequency divider circuit 100 and the indicator circuit 110, 130 a display panel integrally incorporating the indication of the fuel consumption rate provided by the indicator circuit 90 and the indication of the total fuel amount consumed provided by the indicator circuit 110.

Figure 2:
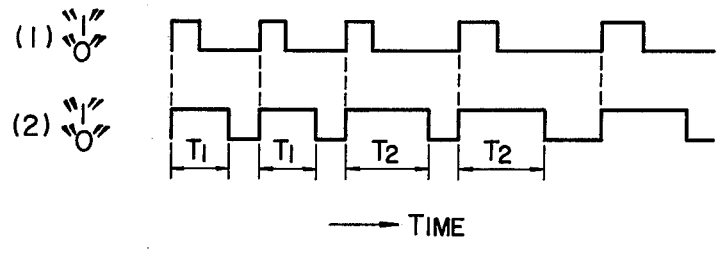
FIGS. 2 and 3 are voltage waveform diagrams for explaining the operation of the meter according to the invention.
Figure 3:
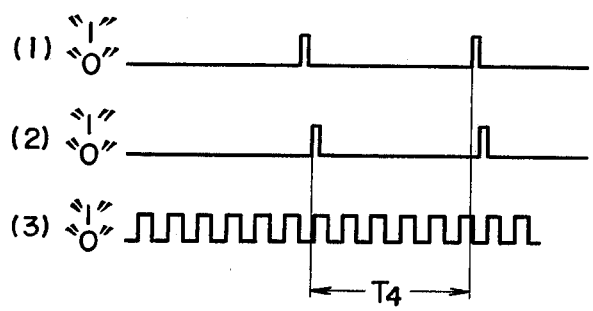

FIGS. 2 and 3 are waveform diagrams showing the voltage waveforms generated at various points in the circuitry of FIG. 1. Shown in FIG. 2(1) is the revolution pulse generated at the terminal 10a by the waveform shaping circuit 10 of FIG. 1 and FIG. 2(2) shows the consumption pulse generated at the output terminal 30a by the pulse generator circuit 30 of FIG. 1. In FIG. 2, the pulse width of $T_1$ indicates that the engine intake pressure is $P_1$ mmHg and the pulse width of $T_2$ indicates that the engine intake pressure is $P_2$ mmHg.

FIGS. 3(1) and 3(2) respectively show the instruction pulse and the synchronizing pulse generated respectively at the output terminals 50a and 50b of the fuel amount unit pulse generating circuit 50 in FIG. 1, and FIG. 3(3) shows the speed pulse generated at the output terminal 60a of the waveform shaping circuit 60 in FIG. 1. FIG. 3 shows that a total of 6 speed pulses arrive by the time that the consumption of fuel amounts to 0.4 cc thus indicating that if a vehicle moves 0.4 m per one speed pulse, the distance traveled by the vehicle is 2.4 m and the fuel consumption rate is 2.4/0.4 = 6 or 6 km/liter. This value of (6) is stored in the memory circuit 80 and the indicator circuit 90 gives an indication of 6 km/liter.

Figure 4:
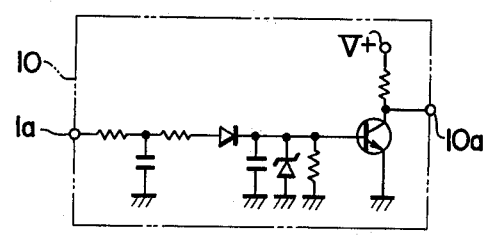
FIGS. 4, 5, 6, 7, 8, 9, 10 and 11 are wiring diagrams showing the detailed circuit constructions of the blocks shown in FIG. 1.
Figure 5:
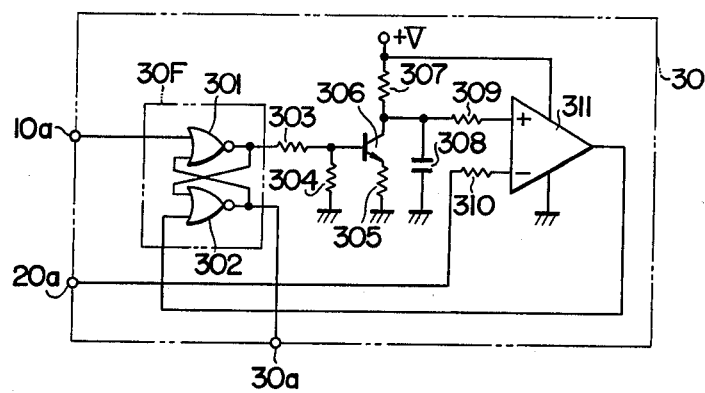

FIGS. 4 and 5 are wiring diagrams respectively showing the detailed circuit constructions of the waveform shaping circuit 10 and the pulse generator circuit 30 of FIG. 1. In FIG. 4, the noise component included in the breaking signal at the terminal 1a is removed and a rectangular revolution pulse synchronized with the revolution of the engine is generated at the terminal 10a. In FIG. 5, when the revolution pulse at the terminal 10a goes to the "1" level, the output of a NOR gate 301 constituting, along with a NOR gate 302, a flip-flop 30F goes to the "0" level so that the base current flowing through bias resistors 303 and 304 is stopped turning a transistor 306 off and consequently its collector potential $V_c$ increases with a preset time constant dependent on a resistance value $R$ of a resistor 307 and a capacitance $C$ of a capacitor 308 in accordance with an equation $V_c = V \cdot (1 - e^{-t/RC})$ or approximately $V_c \approx K \cdot C \cdot R \cdot t$ (where $K$ is a constant and $t$ is a time variable). The collector potential $V_c$ is applied to the non-inverting terminal (+) of a voltage comparator 311 through a resistor 309. On the other hand, a pressure signal having a potential $E_1$ which is proportional to the intake pressure P (mmHg) of the engine is generated at a terminal 20a and applied to the inverting terminal (−) of the voltage comparator 311 through a resistor 310 so that the output of the voltage comparator 311 changes from the "0" to "1" level when $V_c = E_1$. This transition operation causes the output of the NOR gate 301 of the flip-flop 30F to go to the "1" level and thus the transistor 306 is turned on. When this occurs, the collector potential $V_c$ becomes equal to a voltage $V_o$ divided by the collector resistor 307 and an emitter resistor 305 and the output of the voltage comparator 311 goes to the "0" level when $V_o < E_1$. The above-mentioned operation is repeated in response to the arrival of the "1" level pulse at the terminal 10a. Consequently, the consumption pulse having the time width $T_1$ as shown in FIG. 2(2) is generated at the output terminal 30a of the NOR gate 302 in the flip-flop 30F, whereas the consumption pulse having the time width $T_2$ is generated when the intake pressure of the engine becomes P2.

Figure 6:
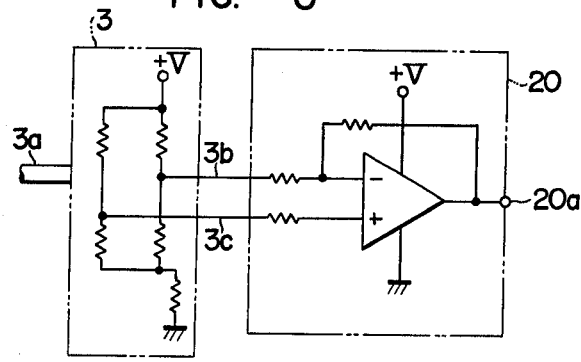

FIG. 6 is a wiring diagram showing the detailed circuit construction of the pressure sensor 3 and the amplifier circuit 20, in which a detection signal generated between the output terminals 3b and 3c of the pressure sensor 3 is amplified by the differential type amplifier circuit 20 and a pressure signal proportional to the magnitude of the engine intake pressure P introduced into the tube 3a is generated at the terminal 20a. The potential E of this pressure signal is preset so that when the intake pressure P becomees equal to 1 atmosphere (760 mmHg), the potential E becomes $E_o$ which is equal to the divided voltage $V_o$ by the resistors 305 and 307 in the pulse generator circuit 30.

Figure 7:
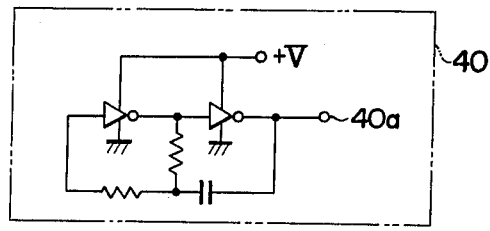

Next, FIG. 7 is a wiring diagram showing the detailed circuit construction of the clock pulse generator circuit 40 of FIG. 1 and the clock pulse generator circuit 40 comprises a known type of astable oscillator circuit. The oscillation frequency is selected so that one cycle of the clock pulse generated at the terminal 40a corresponds to fuel consumption amount 0.8 mcc.

Figure 8:
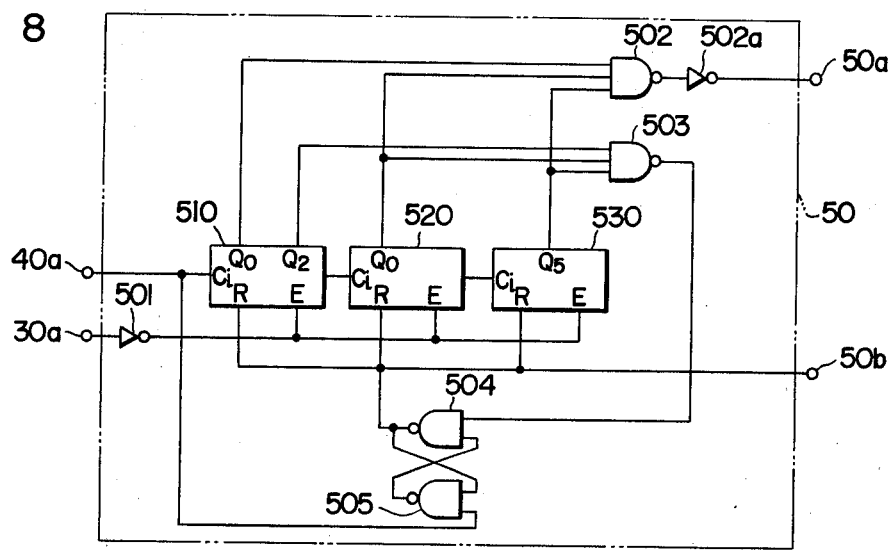

FIG. 8 is a wiring diagram showing the detailed circuit construction of the fuel amount unit pulse generating circuit 50 of FIG. 1, in which when the "1" level consumption pulse shown in FIG. 2(2) is applied to the terminal 30a, the consumption pulse is changed to the "0" level through a NOT gate 501 and the clock pulses applied to the terminal 40a are counted by decade counter circuits 510, 520 and 530. When a total of 500 clock pulses arrive while the respective E terminals of these decade counter circuits 510, 520 and 530 remain at the "0" level, all of their respective $Q_o$, $Q_o$ and $Q_5$ output terminals go to the "1" level and the output of a NAND gate 502 goes to the "0" level which in turn is inverted through a NOT gate 502a thus generating at the terminal 50a the "1" level instruction pulse shown in FIG. 3(1). When the number of the applied clock pulses reaches 502 pulses, the respective $Q_2$, $Q_o$ and $Q_5$ output terminals of the decade counter circuits 510, 520 and 530 go to the "1" level and the output of a NAND gate 503 goes to the "0" level. Consequently, the "1" level synchronizing pulse shown in FIG. 3(2) is generated at the output of a NAND gate 504 of the flip-flop comprising NAND gates 504 and 505 or the terminal 50b. Simultaneously, all the decade counter circuits 510, 520 and 530 are reset to start the counting operation again.

Figure 9:
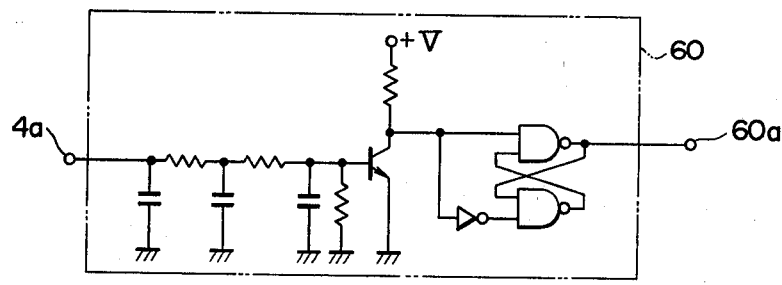

FIG. 9 is a wiring diagram showing the detailed circuit construction of the waveform shaping circuit 60 of FIG. 1, in which the noise component included in the speed signal generated at the output terminal 4a of the vehicle speed sensor 4 is removed and the signal is then subjected to a ½ frequency division generating at the terminal 60a the reshaped speed pulses shown in FIG. 3(3).

Figure 10:
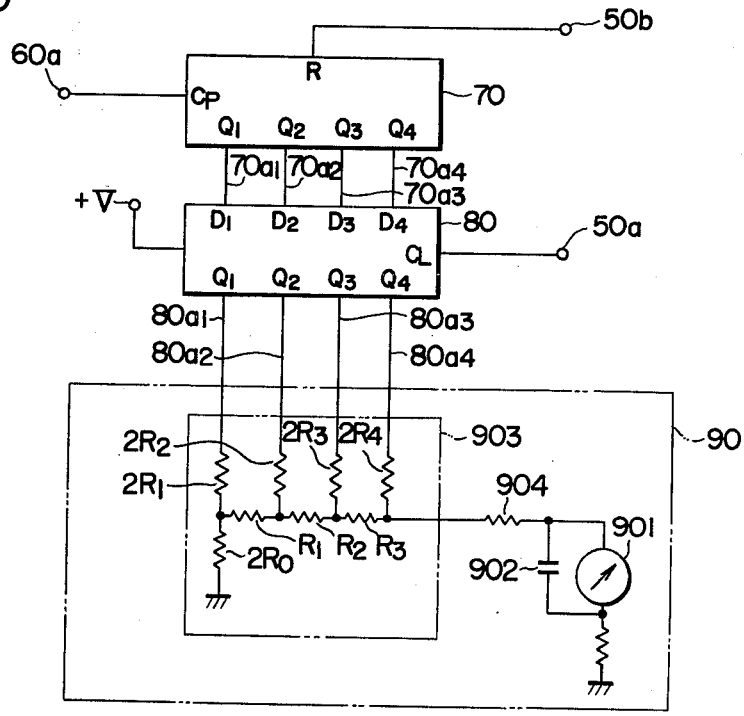

FIG. 10 is a wiring diagram showing the detailed circuit constructions of the fuel consumption rate counter circuit 70, the memory circuit 80 and the indicator circuit 90. The fuel consumption rate counter circuit 70 is reset in response to the application to its R terminal of the synchronizing pulse generated from the fuel amount unit pulse generating circuit 50, counts the speed pulses which are introduced to its $C_p$ terminal from the output terminal 60a of the waveform shaping circuit 60 and delivers the count representing the fuel consumption rate to terminals $70a_1$, $70a_2$, $70a_3$ and $70a_4$ through its $Q_1$, $Q_2$, $Q_3$ and $Q_4$ terminals. In the memory circuit 80 which receives this output count, the count is introduced as the input data to its $D_1$, $D_2$, $D_3$ and $D_4$ terminals and the instruction pulse generated at the terminal 50a by the fuel amount unit pulse generating circuit 50 is applied to its $C_L$ terminal, so that the data is stored in response to the arrival of the instruction pulse and the stored value is delivered to terminals $80a_1$, $80a_2$, $80a_3$ and $80a_4$ through $Q_1$, $Q_2$, $Q_3$ and $Q_4$ terminals. The indicator circuit 90 which receives this stored value comprises resistors $2R_0$, $2R_1$, $2R_2$, $2R_3$, $2R_4$, $R_1$, $R_2$ $R_3$ constituting a digital-to-analog conversion resistance ladder 903, a current limiting resistor 904, an indicating ammeter 901 and a smoothing capacitor 902. The resistance value of the current limiting resistor 904 is adjusted so that when all of the signals at the $Q_1$, $Q_2$, $Q_3$ and $Q_4$ output terminals of the memory circuit 80 are at the "1" level, the indicating ammeter 901 gives the maximum needle deflection, whereas when the signals at the $Q_1$, $Q_2$, $Q_3$ and $Q_4$ output terminals of the memory circuit 80 are respectively at the "1," "1," "1" and "0" level, for example, the indicating ammeter 901 gives a 7/15 needle deflection. On the other hand, if the resistance value of the current limiting resistor 904 is preset so that the indicating ammeter 901 gives the maximum needle deflection when the signals at the $Q_1$, $Q_2$, $Q_3$ and $Q_4$ output terminals of the memory circuit 80 are respectively at the "0," "0," "0" and "1" level, the indicating ammeter 901 gives a ⅛ needle deflection when the $Q_1$, $Q_2$, $Q_3$ and $Q_4$ output terminals are respectively at the "1," "1," "1" and "0" level.

Figure 11:
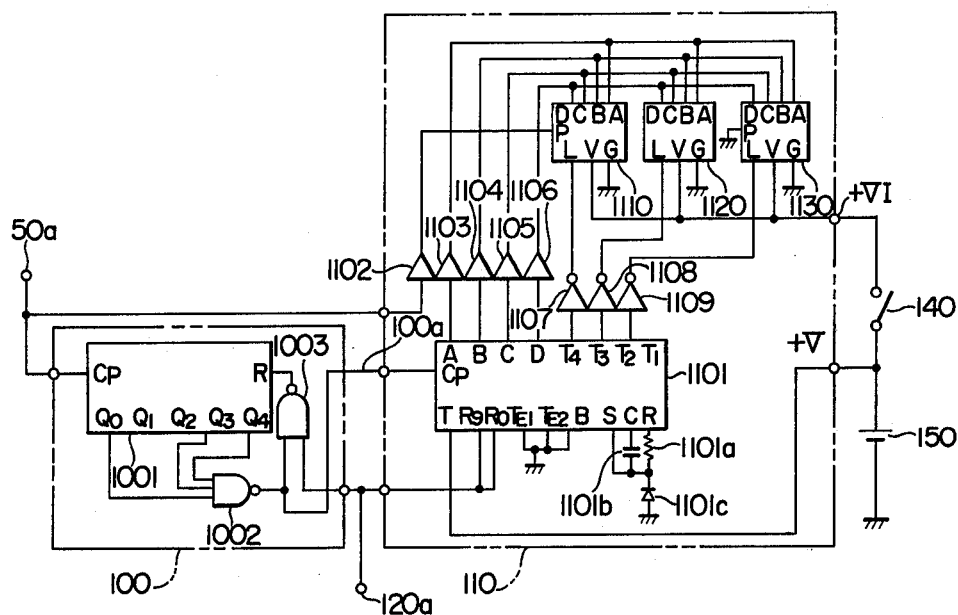

FIG. 11 is a wiring diagram showing the detailed circuit constructions of the frequency divider circuit 100 and the indicator circuit 110 of FIG. 1. The instruction pulses generated at the output terminal 50a of the fuel amount unit pulse generating circuit 50 are applied to the frequency divider circuit 100 at the $C_P$ terminal of a binary counter 1001 so that these pulses are successively counted and divided and $Q_0$, $Q_3$ and $Q_4$ terminals go to the "1" level upon completion of a 1/25 frequency division. When all of the $Q_0$, $Q_3$ and $Q_4$ terminals go to the "1" level, a NAND gate 1002 generates a "0" level reset pulse to reset the binary counter 1001 through a NAND gate 1003 and at the same time a unit pulse is delivered to the terminal 100a. This unit pulse corresponds to the fuel consumption of 10 cc since each instruction pulse represents the fuel consumption of 0.4 cc. The NAND gate 1003 similarly resets the binary counter 1001 in response to the application of a "0" level reset signal by the switching operation of the reset switch 120.

In the indicator circuit 110 which receives the unit pulses generated at the terminal 100a, the unit pulses generated at the terminals 100a are applied to a $C_P$ terminal of a four-digit decimal counting circuit 1101 which integrates these unit pulses. The four-digit decimal counting circuit 1101 may for example be the known Toshiba Product Number TC 5001C. A storage signal terminal T of the counting circuit 1101 is connected to a supply terminal +V so that a "1" signal is always applied to the terminal T, and reset terminals $R_9$ and $R_0$ are connected to a reset terminal 120a of the four-digit decimal counting circuit 1101 so that the four-digit decimal counting circuit 1101 is reset in response to the application of a "0" signal, whereas it performs the counting operation in response to the application of a "1" signal. Test terminals $T_{E_1}$ and $T_{E_2}$ and an extinction terminal B of the four-digit decimal counting circuit 1101 are all grounded, terminals S, C and R which are oscillated for generating scan clocks are arranged so that a resistor 1101a and a capacitor 110b are respectively connected to the terminals R and C between the latter and the terminal S, and the terminal S is connected to the cathode of a diode 1101c whose anode is grounded. Indication signal output terminals A, B, C and D of the four-digit decimal counting circuit 1101 are respectively connected to the input terminals of non-inverting buffer gates 1103, 1104, 1105 and 1106, and scan signal output terminals $T_4$, $T_3$ and $T_2$ are respectively connected to the input terminals of inverting buffer gates 1107, 1108 and 1109. The output terminals of the non-inverting buffer gates 1103 through 1106 are respectively connected to the respective input terminals A, B, C and D of light emitting diode (LED) digit display elements 1110, 1120, and 1130 and the output terminals of the inverting buffer gates 1107 through 1109 are respectively connected to the latch terminals L of the LED digit display elements 1110, 1120 and 1130. Each of the LED digit display elements 1110, 1120 and 1130 may for example be a known type of LED display unit such as the Yokokawa Hewlett Packard 5082-7302. The respective supply terminals V of the LED digit display elements 1110, 1120 and 1130 are connected to a supply terminal + VI to which the supply voltage is applied only when the display is required and the other supply terminals G are grounded. Namely, the supply terminal +VI is connected to a power source 150 through for example an ignition key switch 140 constituting interrupting means which is closed only on demand. The LED digit display elements 1110, 1120 and 1130 respectively display digit in tens, units and decimal fraction units and a decimal point signal terminal P located in front of the digit to the displayed by the LED digit display element 1130 is grounded so that it is always lighted when a voltage is generated at the supply terminal + V. Consequently, when the digits displayed by the LED digit display elements 1110, 1120 and 1130 are respectively (1), (3) and (5), then the reading is 13.5 liters. If, for example, 1234 pulses are applied to the input terminal 100a of the integrating indicator circuit 110, the pulses are integrated and counted by the four-digit decimal counting circuit 1101 so that since the lowest order digit ($T_1$) is not displayed as shown in FIG. 11, the LED digit display elements 1110, 1120 and 1130 respectively display digits (1), (2) and (3) thus reading 12.3 liters. Further, since the power supply path of the four-digit decimal counting circuit 1101 is connected to the power source 150 through the supply terminal + V at which the voltage is always generated even if the display are off and consequently the four-digit decimal counting circuit 1101 stores its counted value even if the ignition key switch 140 has been opened to extinguish the display of the LED digit display elements 1110, 1120 and 1130, when the digits are lighted, the LED digit display elements 1110, 1120 and 1130 indicate the total amount of fuel consumed from the time of its resetting up to the present. Further, since the instruction pulse which is generated at the terminal 50a for every fuel consumption of 0.4 cc is applied through a noninverting gate 1102 to a signal terminal P which lights a dotlike flashing display element located before the digit displayed by the LED digit display element 1110 or the highest order or third place digit, it is possible to judge the momentary amount of fuel consumed according to the flashing rate of this dot while the display are on.

Figure 12:
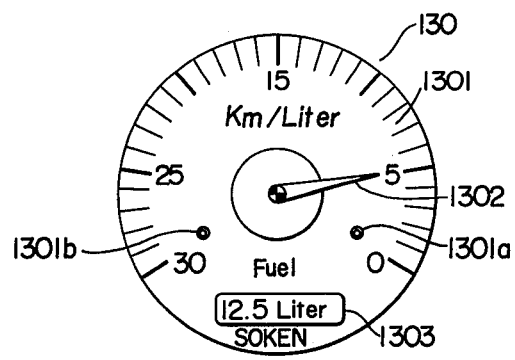
FIG. 12 is a plan view showing the detailed construction of the display panel shown in FIG. 1.

FIG. 12 shows the detailed construction of the display panel 130 of FIG. 1, in which numeral 1301 designates a dial plate for indicating the fuel consumption rate which is fixed in place by small bolts 1301a and 1301b and graduated in units of km/liter. Numeral 1302 designates the needle of the ammeter 901 in the indicator circuit 90 for indicating the fuel consumption rate, 1303 an indicating window for indicating the total amount of fuel consumed or the remaining fuel amount after the refueling, namely, the figure displayed by the display elements 1110, 1120 and 1130 in the indicator circuit 110. The needle 1302 is deflected through an angle corresponding to the fuel consumption rate to indicate the fuel consumption rate by the corresponding graduation on the dial plate 1301. On the other hand, the power supply for the indication of fuel amount is associated with the key switch 140 or the like so that the fuel amount is indicated by the closing of the key switch 140 and the fuel amount is stored in the memory even after the key switch 140 has been opened, and the stored count value is cleared by the reset switch 120.

While, in the embodiment of the invention described above, the dial plate 1301 is marked with the fuel consumption rate indicating graduations which are arranged progressively in the counter-clockwise direction, the graduations may be arranged in the clockwise direction. Further, while the ammeter needle 1302 is used, it is possible to use a magnetic coupling type meter. Still further, while the fuel consumption rate meter used is of the type which indicates the fuel consumption rate in units of km/liter, it is possible to use a momentary fuel consumption rate meter of the type which indicates the fuel consumption rate in units of liter/km, liter/sec or the like. Furthermore, while the fuel meter is reset by the reset switch 120 upon the refueling of the tank, it is possible to use a fuel meter of the type which is set for example to a value corresponding to the replenished fuel quantity.

We claim:

1. A fuel-meter-combined fuel consumption rate meter for engine-mounting vehicles comprising:

measuring means for generating an output signal indicative of the momentary amount of fuel consumed by the running vehicle, computing means for computing the momentary rate of fuel consumption and generating an output signal thereof from said output signal of said measuring means, first indicating means comprising an ammeter with a needle responsive to said computing means output for indicating said momentary fuel consumption rate thereon in analog form in response to said output signal of said computing means, integrating means connected to said measuring means for generating an output signal indicative of an accumulative amount of fuel consumed by integrating said output signal of said measuring means, and second indicating means comprising a plurality of digital display elements for indicating in digital form said accumulative fuel amount on said ammeter of said first indicating means in response to said output signal of said integrating means.

2. A fuel-meter-combined fuel consumption rate meter for engine-mounting vehicles comprising: p1 means for generating a first electric signal corresponding to the number of revolutions of an engine;

means for generating a second electric signal corresponding to the intake pressure of said engine;

a circuit for receiving said first and second electric signals to generate a third electric signal corresponding to the amount of fuel consumed by said engine;

means for generating a fourth electric signal corresponding to the speed of a vehicle;

a circuit for receiving said third and fourth signals to generate a fifth electric signal corresponding to the momentary rate of fuel consumption;

a circuit for receiving said third electric signal to generate a sixth electric signal corresponding to an accumulative amount of fuel consumed; and means for receiving said fifth and sixth electric signal to indicate said momentary fuel consumption rate and said accumulative amount of fuel consumed on the same display panel.

* * * * *